June 27, 1939. E. A. REID 2,164,083
HUMIDIFIER
Filed Jan. 13, 1936 2 Sheets-Sheet 1

Inventor
Elmer A. Reid

June 27, 1939.  E. A. REID  2,164,083
HUMIDIFIER
Filed Jan. 13, 1936  2 Sheets-Sheet 2
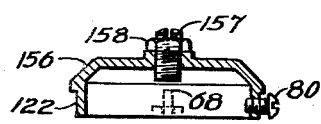
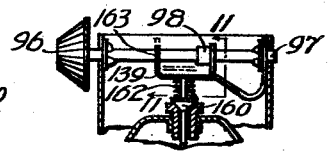
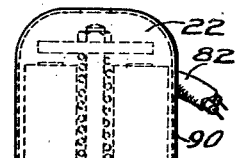
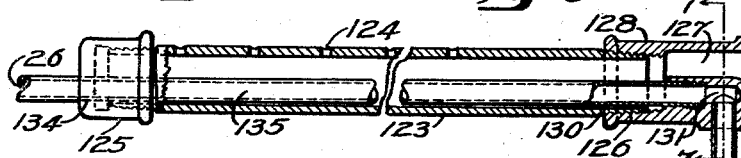
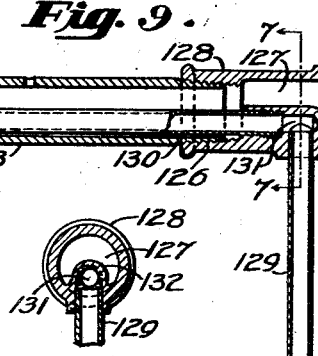
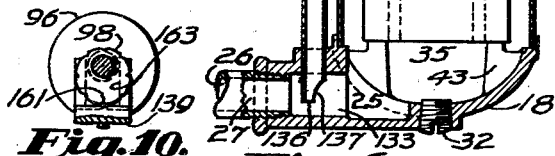
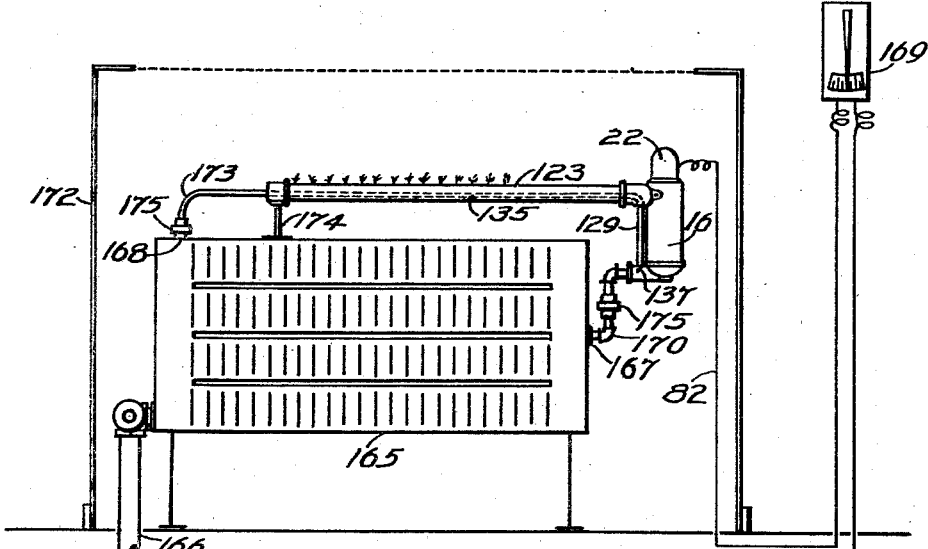
Inventor
Elmer A. Reid Patented June 27, 1939

2,164,083

UNITED STATES PATENT OFFICE 2,164,083

HUMIDIFIER

Elmer A. Reid, Morrisville, Pa.

Application January 13, 1936, Serial No. 58,883

11 Claims. (Cl. 237—78)

This invention relates to humidifiers which connect with a humidifying fluid supply for the emission of vapor. The invention has mechanism particularly adapted for partial vacuum retention as the pressure of the supply is reduced below atmospheric pressure.

As set forth in Letters Patent, numbers 1,930,771, and 1,993,116, issued to me of October 17, 1933, and of March 5, 1935, respectively, the present invention similarly furnishes convenient means of control of operation and of connection of the device with a steam supply. In the disposition of condensate, this invention provides for the return of condensate to the steam supply, and, by the transmitted heat of steam heated means, converts condensate into vapor to the atmosphere, incident to the emission of vapor from the steam supply.

That devices have been provided for delivering vapor from a steam supply in which the valve elements of valves cooperate with the seats by gravity to prevent the entrance of air, is known, but in such devices, proper functioning of valve parts is not assured. Such a condition is particularly characteristic of low unit-pressure valves after a period of disuse, wherein the valve elements stick to their seats and cause the functional failure of the valves, necessitating their reconditioning. A humidifying device, functioning in accordance with the present invention, however, has its operating parts so proportioned, constructed, and controlled, that valve seating is certain.

The objects of this invention are: to provide for residential, institutional and commercial uses a compact, efficient humidifier of superior structural detail and functional control, adapted for the admission of vapor from a steam supply, and its emission to the atmosphere, and for the retention of partial vacuum as the pressure of the supply is reduced below atmospheric pressure; to provide an improved humidifier, adapted for convenient connection with a steam supply, and support by a carrier of the steam supply, the humidifier, as an incident to the discharge of vapor from the steam supply, primarily returning condensate to the steam supply, and, by the transmitted heat of steam heated means, converting condensate into vapor to the atmosphere; to provide in a humidifier, a movable steam compartment with means automatically shutting off the discharge of steam preceding the vacuum phase; to provide in a humidifier, a pressure compartment having a pressure responsive element, and having an outlet valve adapted for discharging the pressure from said compartment with the movement of said responsive element; to provide a steam expanding compartment with automatic valve control in which pressure and vacuum alternate, incident to the subsiding and the returning of the steam; to provide a steam expanding compartment having in alternation pressure and vacuum phases, and having accelerated discharge of condensate in the vacuum phase as the volume of the compartment is reduced; to provide an expansion element carrying a discharge valve into engagement with contact means for opening the valve as the element expands; to provide adjustable means adapted for contacting with the outlet valve of a pressure controlled compartment for regulating the discharge from said compartment; to provide in a humidifier, contact means cooperating with pressure controlled means, which are adapted for opening a discharge valve against pressure for the emission of vapor and for closing the discharge valve for the retention of vacuum; to provide a humidifier having means of control automatically responsive to the control of a remotely located humidostat for relative humidity regulation; to provide a humidifier emitting vapor from a steam supply having means exposed for operation for shutting off the emission of vapor; to provide a humidifier with an extended vapor-distributing outlet having supplemental heating means therefor, and having means whereby condensate accumulating therein, is vaporized; to provide in an improved humidifier, connecting with a steam supply, associate means, also connecting with the steam supply and adapted for circulating steam as an auxiliary heating medium of the humidifier; to provide the fluid receptacle of a humidifier with a cleaning drain outlet, preferably threaded, located at the bottom, and with cooperative means adapted to open and to close the outlet; to provide a steam humidifier, having, as an auxiliary part thereof, a container, adapted to receive a supply of healthful or fragrant substances and to discharge auxiliary vapors; to provide an inverted cup-shaped chamber adapted for cushioning the velocity of the steam discharging therein, and for diverting the steam flow downward in its passage from the chamber; to lower the velocity of vapor discharge from the valve outlet of the compartment of a humidifier by substantially balancing the intake with the outlet through the responses of pressure-responsive elements under regulated pressure; to provide in a humidifier, a receptacle cover with interior dependent means extending below the upper edge of the receptacle for draining condensate accumulation within the receptacle.

The objects and features of the invention will more fully appear from the following description made in connection with the accompanying drawings, in which, Fig. 1 is a vertical sectional elevation of one embodiment of the invention, illustrating an automatic control and a partial side view of openings for emitting vapor.

Fg. 6 is a vertical sectional elevation of the invention, illustrating a modified vapor outlet.

Fig. 7 is a transverse sectional view on line 7—7 of Fig. 6.

Fig. 8 is a cross sectional view of a receptacle cover, illustrating an adjustable valve contactor.

Fig. 9 is a fragmentary sectional view, illustrating a valve with a manual control.

Fig. 10 is an enlarged sectional view on line 11—11 of Fig. 9.

Fig. 11 is a partly diagrammatic view, illustrating the invention in operating connection with a radiator, as a concealed radiation installation electrically connected with a remote humidostat.

Similar numerals refer to similar parts throughout the several views.

Figure 1:
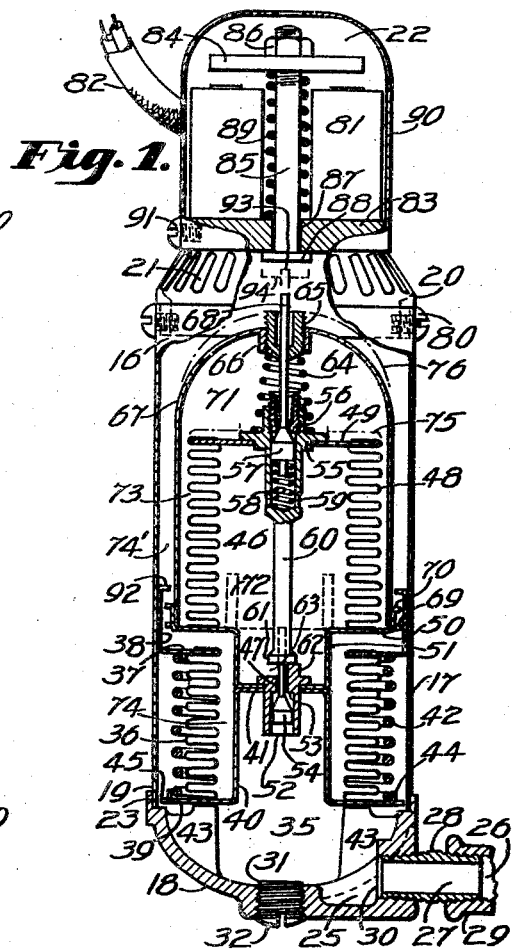

Referring more particularly to Fig. 1, the device, in this instance, represents a receptacle 16, adapted to receive a heating pressure fluid, such as steam, and to emit vapor. Preferably it consists of a thin metal wall 17, which, in general, is cylindrical in shape, a metal lower section 18 which is secured to the lower end 19 of the wall 17 to provide the lower enclosure of the wall 17, and an upper section 20, adapted to provide a cover for the upper end of the wall 17 having the openings 21 for the emission of vapor. Incorporated in the upper section 20 is the control 22 for the discharge of vapor, described hereinafter.

In the assemblage shown the lower end 19 of the metal wall 17 engages with the upwardly extended portion 23 of the metal section 18, and is then securely and tightly joined by suitable means.

In the preferred form, the lower section 18 is provided with a cavity 25 in its lower interior extremity from which the receptacle 16 is connected internally with the interior of the pressure heat fluid supply through the relatively large communicating opening 27 of the nipple connection 28. The connection 28 is here shown in threaded engagement with the outlet 29 of the supply 26 and with the outlet 30 of the lower section 18 of the receptacle 16.

The threaded connection above described provides for convenient connection and for the support of the device. At the bottom of section 18, an outlet 31, is provided for threaded engagement with the member 32 for closing the passage. When desired the member 32 may be removed for testing or for cleaning and draining purposes.

The primary pressure compartment 35 which is in communication with the supply 26 through the passage 27, employs a pressure responsive element 36. This pressure responsive element may consist of a flexible diaphragm or the responsive type bellows, one side of which is subjected to the pressure within the compartment 35, the other side being acted on by the atmospheric pressure.

In the preferred construction shown, this responsive element 36, is of the type commonly known as a sylphon, having its upper end soldered or otherwise secured to the inwardly extended circular flange 37 of the upper cylindrical shell 38. This cylindrical shell 38, as shown, is positioned against the inside of the receptacle wall 17 and soldered or otherwise secured thereto. The lower end of this responsive element 36 may be soldered or otherwise secured to the outwardly extended circular flange 39 of the lower cylindrical shell 40 so that one side of the responsive element 36 will be subjected to the pressure within the compartment 35. Thus, the element 36, the lower shell 40, having its upper end 41 closed, and the upper shell 38, confines the compartment 35 to the lower portion of the receptacle 16.

The compensating spring 42 bears against the upper flange 37 and the lower flange 39 ensuring the full return movement of the pressure responsive element to its lower supports 43. It is held in position on the lower flange 39 by the upwardly bent portions 44. The projections 45, extending outwardly from the lower flange 39, guide the vertical movements of the pressure responsive element 36.

The movable compartment 46, which is in communication with the primary pressure compartment 35 through the valve controlled passage 47, similarly employs a pressure responsive element 48. In the preferred construction, as shown, this element 48 has its upper end soldered or otherwise secured to the top plate 49, while its lower end may be soldered or otherwise secured to the outwardly extended flange 50 of the cylindrical shell 51, so that one side of the responsive element 48 will be subjected to the pressure within the compartment 46, with the other side acted on by the atmospheric pressure. Thus the element 48, with the top plate 49, and with the lower shell 51, which has its lower end closed, encloses the compartment 46.

As illustrated, the lower end of the compartment 46 is mounted on the upper end 41 of the compartment 35 and may be soldered or otherwise secured thereto, forming a partition between the two compartments. The assemblage, through the partition 41 of the valve body 52, having the valve seat 53 and the cooperating valve element 54, provide a valve controlled communicating passage 47 for the two compartments 35 and 46. To the top plate 49 is soldered, or otherwise secured, the valve body 55 downwardly extended into the compartment 46. It embodies the preferably renewable valve seat 56 and the valve element 57, the spring 58, which holds the valve tightly against the seat, and the valve body openings 59. The dependent valve body stem 60 is preferably an integral part thereof and extends downwardly, preferably collinearly, with the lower valve element 54 and the upper valve element 57. The central aperture of the valve seat 56 may provide for the free movement of the valve stem and for a water seal to further ensure tight engagement of the valve element 57 with its seat 56.

The lower end 61 of the upper valve body stem rests upon the raised portion 62 of the lower valve body 52 in its maximum downward movement. As here shown, the valve element 54 is operatively secured to the end of the stem 60, by which assemblage the valved communication passage 47 is controlled functionally through the responses of the pressure responsive element 48. The recess 63 will provide sufficient space for the outlet or condensate when the valve is open.

The spring 64 at its lower end bears against the valve body of the top plate 49, while its upper end bears against the adjusting screw 65 which is in threaded engagement with the threaded opening 66 of the inverted shell 67. The adjusting screw 65, as here shown, has a central aperture to receive the upwardly extended valve stem 68. The upper end of the central aperture is counterbored to provide for free movement of the stem and for a water seal against vapor seepage. Adjusting the screw 65 varies the spring tension bearing against the top plate 49 to regulate the velocity of the discharge from the compartment 46.

It is to be noted that the functioning of the discharge valve 57 is independent of the adjusting screw regulation, and that the valve element may be retained on its seat with relatively even tightness with variations in pressure and for the retention of vacuum by the spring 58.

The cylindrical shell 67, is preferably dome shaped at the upper end, with the lower end opened. As shown, it is removably mounted on the outwardly extended portion of the flange 50, with the interlocking members 69 in interlocking engagement with the rim portion 70 of the flange 50. In the assemblage of the shell 67, which is shown mounted over the compartment 46, is provided the chamber 71 which may serve to cushion the velocity of the discharge from the compartment 46. The openings 72 located in the lower portion of the cylindrical shell 67 provide outlets for the cushioning chamber 71 and the passage 73. The intensified heat transmission to the passages 73 and 74, from the relatively large heating surface of the responsive members 48 and 36, acts as a reheating medium to diffuse the vapor emitted to the atmosphere and for the vaporization of condensate.

The removable cover 20, having the openings 21 for the emission of vapor, may be secured by means of the screws 80, or otherwise held in its position on the receptacle 16. As illustrated, the cover 20 may incorporate the control 22, which, when connecting the electrical connections 82 with the electrical control of a humidostat, responds automatically thereto through the operation of the solenoid or electromagnet 81. In this case the yoke 83, which may form an integral part of the cover 20, supports the magnetic winding of the solenoid 81 and the cores thereto. The armature plate 84 may be provided with a threaded hole to adjustably engage the threaded end of the plunger 85 and may be held securely by the lock nut 86.

The lower portion of the plunger 85 is in slidable engagement with the central hole 87 of the yoke 83. Its lower end may be provided with a flat circular head 88 to limit the upward travel and to operatively contact the valve stem 68 for vapor discharge. The spring 89 at its lower end bears against the yoke 83, with its upper end against the armature plate 84, thus holding the plunger 85 out of contact with the valve stem 68 for shutting off the vapor discharge. The vented casing 90 encloses the control 22 to prevent the access of undesirable matter and to raise the temperature of the dew point within the enclosure. It may be held in its position by means of the screw 91.

As a further aid in the process of manufacture, the construction of the interior mechanism provides for convenient assemblage with a receptacle having the wall and bottom made in one integral part, and having the upper end open for receiving the interior mechanism. In this construction the bottom would be provided with means for effecting a threaded engagement with the fluid supply, which means, would be soldered or otherwise connected thereto.

It is to be noted that steam from the supply 26 fills the primary pressure compartment 35 through the communicating passage 27, then passing through the open valve passage 47, it fills the pressure-movable compartment 46. With the valve outlet of this compartment held tightly closed by the spring 58, the pressure responsive element 48, expands upwardly under slight pressure, seating the valve 54 against further admission of steam. By means of the adjustment screw 65 and spring 64, the pressure of the compartment 46, may be regulated.

In the compartment 35 the responsive element 36 now contracts under the primary steam pressure, thereby expanding the compartment and concurrently raising the partition 41 and the mechanism carried thereon to engage the rim portion 70 with the stop 92 for its maximum upward travel. Thus, with both compartments at their maximum travel, as indicated at 75 and 76, which condition may be maintained indefinitely, the valve stem 68 is moved to the position indicated at 93.

In this condition, in the case of automatic control, the vapor would discharge when the electric circuit closes. The energized winding 81, through magnetic pull, lowers the contact surface of the plunger head 88 to the position indicated at 94 and opens the outlet valve 57 by compressing the valve spring 58. The velocity of discharge from the outlet valve 57 may be lowered by the substantial balancing of the intake with the outlet through the responses to regulative pressure in the compartment and through the movement of the compartment 46.

The intake valve 54, which is operatively connected with this top plate 49, functions with the response of the responsive element of the pressure-movable compartment 46. The lowered velocity discharge into the cushioning chamber 71 is diverted downwardly through the superheated passage 73, and is correspondingly diffused, in its emission through passage 74' and openings 21.

Condensate of the primary pressure compartment 35, readily drains toward, and returns to, the supply 26 through the relatively large communicating passage 27. Condensate, that may accumulate in the lower pocket of the movable compartment 46, vaporizes in contact with the incoming hotter steam. As the steam subsides, the bottom valve 54 opens with the volume contraction of the compartment, thus returning condensate to the lower compartment and back to the supply. Condensate of the upper inner portion of the receptacle flows into the vaporizing chamber 74 and is vaporized.

It is to be noted further, that the steam pressure may move the outlet valve 57 into engagement with opening means to open the valve, and, as the pressure subsides, the subsiding pressure allows the valve to move out of engagement with the opening means and to close tightly in advance of the vacuum phase. The outlet valve 57 remains closed and independent of the opening means until the pressure returns.

The wet steam phase of the on-coming steam, especially in a cooled down heating system, has been an element of particular concern in the now known types of humidifiers for radiators and the like. These humidifiers provide a ready escape to the atmosphere which results in a concentrated flow of on-coming wet steam with the accompanying condensate accumulation. The outlet of my device is closed positively tight. The opening occurs under predetermined pressure, after the elapse of what may be called a preheating period, thus avoiding, to a substantial degree, the condensate of the wet steam phase.

Figure 2:
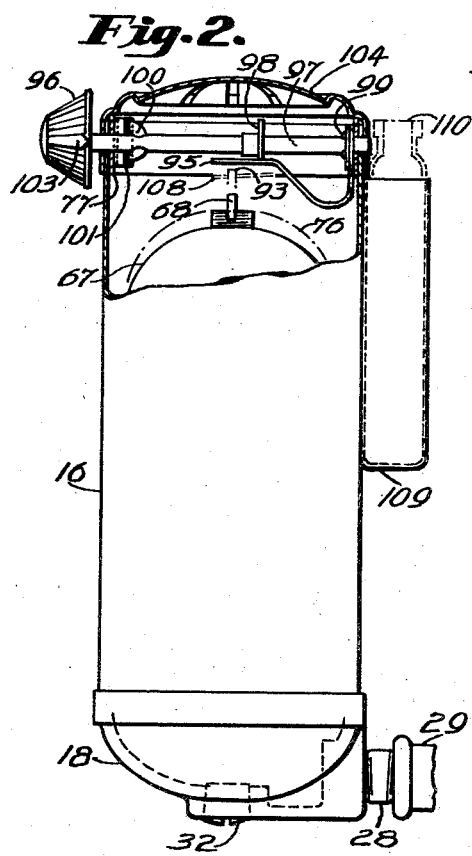
Fig. 2 is a side elevation of the invention, with the upper sectional portion illustrating a manual control and a vented cover.
Figure 3:
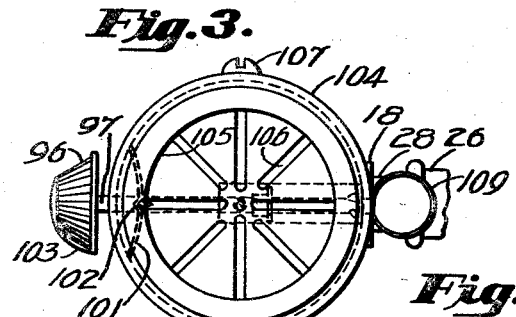
Fig. 3 is a top view of Fig. 2.
Figure 4:
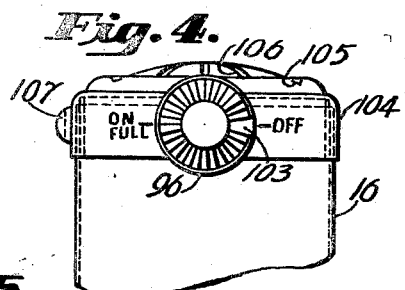
Fig. 4 is a fragmentary front view of Fig. 2.

Figs. 2, 3, and 4 illustrate a humidifier having a manual control exposed for operation for the discharge of vapor to the atmosphere. The interior pressure-controlled mechanism and the receptacle, preferably, may be as previously described, as in Fig. 1. The valve stem 68, Fig. 2, represents the outlet valve when closed with the steam supply subsided. The valve stem in its maximum raised position, as indicated at 93, represents the outlet valve still closed but under pressure from the steam supply.

The turn knob 96, preferably made of heat resisting material, is moulded or otherwise secured to the stem 97. Positioned on, and secured to, the stem 97, is the cam 98. The stem may be further provided with flattened protruding portions 99 and 100, preferably as integral parts thereof. The protrusion 99 may act as a stop for the end plate of the stem bearing against the contactor 95. The contactor 95, made of bronze material in suitable form, has a hole at one end for assemblage on the stem 97, and is in contact with the cam 98 under tension.

The protrusions 100 are provided with edges, preferably at right angles with the stem, for suitable contact with the spring tension and plate 101. The tension and plate 101 has a centrally located hole for assemblage with the stem 97 prior to the forming of the protrusions, and has indentations 102 adapted to register with the protrusions 101 when the turn knob index 103 is at either the "off", or the "on-full", positions.

As shown, the control is supported in opposite bearings at thee upper end of the receptacle 16 with the assembled end parts in contact with interior portions. The cap 104, having openings 106, through which vapor is emitted, provides the enclosure of the upper end of the receptacle. The dome-light or otherwise appropriately shaped top, of the cap 104, is provided with the exterior suitably formed beading or channel 105, circumscribing the openings 106, from which condensed vapor or the like, may be drained into the receptacle. The interior annular shell 77 may be soldered or otherwise secured to the interior of the cap 104. This shell drains off the condensate within the receptacle 16 from a level below that of the upper edge of the receptacle, and prevents leakage of condensate. In this case the dependent rim of the cap, and the interior shell 77, are provided with opposite openings which receive the control and secure it in its mounting in the receptacle. The cap 104 may be secured in its position on the receptacle by the screw 107, or by other appropriate means.

The position of the contactor 95 represents the turn knob index 103 in the "off" position, Fig. 4, leaving the outlet valve closed. The contactor 95 may be compressed to the position indicated at 108 by moving the control turn knob to the "on-full" position with the outlet valve fully opened. A gradual opening or closing of the valve may be effected by the fractional movement of the control turn knob.

In addition to distributing moisture to the air, fragrant and medicinal vapours may also be dispensed by this humidifier through auxiliary means. The container 109 is provided as an auxiliary part of the humidifier, and is adapted to receive its supply of fragrant or healthful substances to be discharged as auxiliary vapors. The container 109 may be adapted to receive a vial or the like, as indicated at 110, in which case the vial may contain the supply of such substances for vaporization. Heat, from the steam supplied to the humidifier, is transmitted to the auxiliary container 109, and to the contents of the container, to generate the auxiliary vapor.

Figure 5:
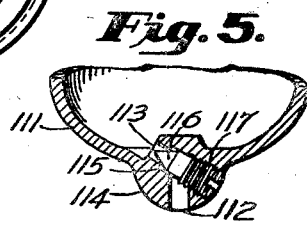
Fig. 5 is a vertical sectional view, illustrating a cleaning drain outlet.

In a humidifier, in which humidifying fluid, in relatively small volume, is admitted for substantially continuous emission of vapor, means are provided for conveniently cleaning and draining the receptacle of fluid or precipitated substances. At the lower end of the fluid receptacle 111, Fig. 5, an outlet 112 is provided for communication with the interior of the receptacle 111, through the opening 113. Associated therewith, are cooperative means adapted to open and to close the outlet. In this instance, the outlet boss 114, is an integral part of the receptacle, having a passage which incorporates the valve seat 115, the threaded needle valve element 116, and the internal screw threads 117. The valve element 116 is adapted to cooperate with the valve seat 115 in threaded engagement with the threads 117 for opening and closing the outlet. In simplified construction, the receptacle may be formed from sheet metal. The outlet, including opening and closing means, may be a separate member, soldered or otherwise secured, to the receptacle.

Fig. 6 illustrates a humidifier having an extended outlet for vapor emission. The interior mechanism, the control and the receptacle, may be, as previously described in Fig. 1. The movable upper section 121 is adapted to support the control and to provide a cover for the upper end of the receptacle wall 17 and may be secured in its position on the receptacle by means of the screws 80. The interior depending portion 122 of the cover section 121, which engages the upper interior of the receptacle wall 17, may be further adapted to drain off condensate within the receptacle from a level below that of the upper edge of the receptacle.

The outlet extension 123, preferably of non-corrosive pipe, is provided with outlets 124 and with the end cap 125. The outlets 124 are provided for the emission of vapor and are located so as to prevent leakage of condensate. The outlet extension 123 is connected internally with the interior of the receptacle through the communicating opening 127 of the connector 128. The extension 123 is supported laterally and pitched to drain condensate toward the receptacle. The connector 128 may be soldered and otherwise secured to the upper portion of the receptacle wall 17. If preferred, the support 128 may be an integral part of a moulded receptacle, and further, it may form a part of a suitable removable cover with a union connection introduced into the pipe 129. The connector 128 is preferably provided with the interior threads 126 for convenient attachment and support of the external threaded end 130 of the extension 123.

The intercommunicating chamber 131 of the connector 128 is partitioned from the passage 127 by means of the walls 132. The chamber 131 is provided with two outlets arranged for intermediate connection with the interior of the pressure heat fluid supply 26. The piping 129 has its upper end securely attached to provide connection with the chamber 131, and has its lower end securely attached to provide connection with the passage 133 of the extension of the lower section 18. The communicating passage 27 connects with the passage 133 and the interior of the supply 26. The piping 135 which has one end securely attached to the connector 128, preferably in threaded engagement, to provide connection with the chamber 131, extends laterally along the aperture 134 of the cap 125 for connection with the supply 26.

Thus, the vapor outlet 123, is provided with a cooperative heating element transmitting heat from a heating medium communicated thereto for reducing the formation of condensate and for evaporating condensate accumulating within the extension. The lower end of the piping 129 extends downwardly within the passage 133 and, as shown in Fig. 6, tapers to the lower edge 136 with the orifice 137 facing the compartment 35. The flow from the supply 26 to the humidifier, creates suction at the orifice 137, inducing circulation of the heating medium to the cooperative heating element of the extension 123.

The cap 156, Fig. 8, represents an upper end enclosure for a receptacle, as shown in Fig. 6. The dependent section 122 engages the upper interior of the receptacle wall 17 and is also adapted to drain off condensate within the receptacle from a level below that of the upper edge of the receptacle. It may be secured in position on the receptacle by the screw 80 or by other appropriate means. The contact screw 157 provides an adjustable contact, adapted to be contacted by the discharge stem 68, as indicated in Fig. 8, as the valve is carried on its mounting by the steam responsive element, previously described herein. The volume of discharge from the discharge valve may be controlled by adjusting the contacts 157 in relation with the valve stem. This adjustment increases or decreases the opening of the valve as the valve is moved by the steam responsive element. Lock nut 158 secures the adjusted position of the contact screw 157.

Fig. 9 illustrates the contactor 139 of the control 96 holding the discharge valve 160 closed on its seat. The contactor 139, made preferably of bronze material in suitable form, has a hole at one end for assemblage on the stem 97, and contacts with the cam 98 under tension. The other end of the contactor 139 is slotted leaving two side portions 163, which are bent upward to freely engage with the sides of the stem, maintaining a central position of the contactor over the valve 160. The cam 98, which is secured to the stem 97, is provided with notches or other suitable members which register with the contactor 139, as shown at 161, Fig. 10. Movement of the control 96, which correspondingly moves the cam 98, causes the contactor 139 to move upward or downward. In this instance the intermediate movements of the contactor regulate the opening of the valve 160 by compressing the intermediate coil spring 162, and, when in its low position, corresponding with the "off" position of the control, Fig. 4, the contactor, contacts the stem of the valve 160 to hold the valve closed.

Fig. 11 illustrates a partly diagrammatical installation of one form of the invention applied to concealed radiation. The heating radiator 165 within the enclosure 172, connects with the steam supply through the piping 166. The radiator is provided with two regulation openings indicated at 167 and 168. The humidifier 16 is communicatively mounted to the radiator by the piping 170 in threaded engagement with the threaded opening 167. The supplemental heating element 135, of the extended vapor-distributing outlet 123, is communicatively connected to the interior of the radiator by the piping 173, in threaded engagement with the threaded opening 168. The extended outlet 123, which is supported laterally and pitched to drain condensate toward the receptacle of the humidifier 16, may be provided with the outer support 174. The unions 175 in the piping 170 and 173 are adapted to provide convenient connections of the humidifier in assemblage with the radiator 165.

The flow of steam from the radiator to the humidifier creates suction at the orifice 137 inducing circulation of the heating medium to the supplemental heating element of the extended vapor-distributing outlet 123. The heat transmitted to the extended vapor outlet reduces the formation of condensate and vaporizes the condensate accumulating therein. The discharge of vapor from the humidifier 16 may be automatically controlled by the remotely located humidostat 169. The vapor discharge control 22, which is connected electrically through the electrical connections 82 with the humidostat 169, responds automatically to the control of the humidostat for relative humidity regulation.

While the foregoing detailed description is given particularly for clearness of understanding, it is obvious that various changes in the form, construction and arrangement of parts may be made therein, without departing from the essential features and scope of the invention as set forth in the appended claims.

I claim:

1. A humidifying device comprising a receptacle adapted for receiving steam from a steam supply and for emitting vapor; a compartment movable in said receptacle, said compartment having an inlet for the admission of steam; means in said receptacle confining within maximum limits of operation the movement of said compartment; an outlet valve for said compartment; and means causing said outlet valve to open for emitting vapor from said compartment as an incident to the movement of said compartment.

2. A humidifier comprising a receptacle having an inlet for connecting with a humidifying fluid supply and having an outlet for emitting vapor, an expansible element in said receptacle, a movable compartment for receiving humidifying fluid carried by said element, an outlet valve for said compartment, and control means acting cooperatively with said movable compartment for opening and closing said valve and hence controlling the emission of vapor.

3. A humidifier comprising a receptacle having an inlet for connecting with a humidifying fluid supply and having an outlet for emitting vapor, a movable compartment in said receptacle for receiving humidifying fluid, a valve for said compartment, pressure responsive means for extending said valve into position for opening, and means controlling the emission of vapor by opening and closing said valve when said valve is in the extended position.

4. In a humidifying device adapted to emit vapor from a steam supply, a receptacle; a compartment movable in said receptacle, said compartment having a valved outlet, comprising a self-closing valve; means in said receptacle confining within maximum limits of operation the movement of said compartment; and means for operating the said valve as said compartment is extended to said maximum limits of operation.

5. A humidifier comprising a receptacle having an inlet for connecting with a humidifying fluid supply and having an outlet for emitting vapor, a compartment in said receptacle for receiving humidifying fluid, means for mounting said compartment for floating vertical movement, a valve for said compartment, and electrical operating means for causing said valve to open as an incident to said floating vertical movement.

6. A humidifier comprising a receptacle having an inlet for connecting with a humidifying fluid supply and having an outlet for emitting vapor, a compartment in said receptacle for receiving humidifying fluid, means for mounting said compartment for a floating vertical movement, a valve for said compartment, and manual control means exposed for operation for causing said valve to open as an incident to said floating vertical movement.

7. A humidifier comprising a receptacle having an inlet for connecting with a steam supply and having an outlet for emitting vapor, a movable compartment in said receptacle for receiving steam, an outlet valve for said compartment, pressure responsive means for extending said valve into position for opening, an electrical operative device comprising a contact member and means for moving said contact member into operable engagement for causing the unseating of the valve when in said extended position, and means for causing the reseating of said valve for vacuum retention as an incident to the receding movement of said valve from said contact member as the supply of steam diminishes.

8. In a humidifier, a receptacle adapted for receiving steam from a steam supply and for emitting vapor; a steam compartment in said receptacle; an outlet valve for said compartment; and a manual control comprising contact means for engaging with said valve; a transversely disposed shaft having off-set means for moving said contact means; and an exposed heat resisting member for said shaft whereby the movement of said member controls the said valve for starting and stopping the humidifier.

9. In an automatically operating steam humidifier, the combination with a steam supply, of a receptacle having an inlet for connecting with said steam supply and having a nipple outlet for vapor discharge; a vented extension leading from said outlet, said extension being arranged for returning condensate to said receptacle as vapor is being discharged; and supplemental heating means connecting with said steam supply, said supplemental heating means having its ends connecting with said steam supply providing a passageway for circulating steam along said extension, thus heating the said extension.

10. In a humidifier of the class described, a receptacle adapted for receiving steam from a steam supply and for emitting vapor; a steam compartment movable in said receptacle; an outlet valve for said compartment; a vapor discharge passageway in said receptacle having in the lower portion thereof, a condensate vaporizing chamber, and, in the upper portion thereof, a cushioning chamber covering the outlet of said valve, said cushioning chamber moving freely with said compartment; and heat transmitting means for vaporizing condensate and for diffusing vapor from said cushioning chamber.

11. A humidifier comprising a receptacle having an inlet for connecting with a steam supply and having an outlet for discharging vapor; a chamber in said receptacle adapted for receiving steam, said chamber having a pressure responsive element enclosing a portion thereof; a compartment movable in said receptacle carried by said chamber, said compartment having another pressure responsive element enclosing a portion thereof; an outlet valve carried by said compartment; a normally open valved-passage communicating with said chamber and with said compartment; means for mounting the valve element of said valved-passage for effecting movement with the movement of the pressure responsive element of said compartment; pressure regulating means for maintaining regulated pressure within said movable compartment; means in said receptacle confining within maximum limits of operation the movement of said compartment; a vapor discharge passageway in said receptacle including in the upper portion thereof a movable cushioning chamber covering said outlet valve, and in the lower portion thereof, a condensate vaporizing chamber; contact means for unseating said outlet valve as the steam pressure moves said compartment; and means for reseating the said outlet valve for vacuum retention incident to the receding movement of the said compartment as the supply of steam diminishes.

ELMER A. REID.